3,265,678
PROCESS FOR PREPARING POLYVINYL FLUORIDE
James Lee Hecht, Buffalo, N.Y., assignor to E. I. du Pont de Nemours and Company, Wilmington, Del., a corporation of Delaware
No Drawing. Filed May 18, 1961, Ser. No. 110,875
2 Claims. (Cl. 260—92.1)

This invention relates to an improved process for the preparation of polymeric materials and more particularly to an improved continuous process for the polymerization of vinyl fluoride.

In any continuous process, reproducibility of the material produced over long and sustained production runs is requisite if the process is to be operated economically and the final product is to meet commercial quality specifications. Heretofore, the following continuous process for the polymerization of vinyl fluoride has been plagued with the sudden appearance of polymer of lower molecular weight than was being produced under controlled, steady-state conditions. From the moment of its sudden and unexplained appearance, the molecular weight of the polymeric product remained substantially lower than that of the normal quality polymer. This low molecular weight polymer tends to be less thermally stable and more difficultly melt extrudable into films and other shaped articles than the normal, high quality polymer produced during "on control" periods. Films produced from this low molecular weight polymer exhibit lower break elongations and shorter outdoor weatherability than films produced from normal, high quality polymer. The only effective solution to this problem was to stop production, empty and clean the reactor and then restart polymerization.

It is an object of this invention to provide an improved process of this invention to provide an improved process for the preparation of polymeric materials. It is a further object to provide an improved continuous process for the polymerization of vinyl fluoride. It is a still further object to effect economies in the production of vinyl fluoride polymers without detracting from the quality of the polymeric product. These and other objects will appear hereinafter.

A particularly attractive process for the polymerization of vinyl fluoride involves charging a suitable reaction vessel equipped with agitating means with water and a water-soluble reaction initiator, e.g., 2,2'-diguanyl-2,2'-azopropane dihydrochloride along with a stream of vinyl fluoride, the amount of water employed ranging from 0.1 to 20 and preferably from 3 to 20 times the weight of vinyl fluoride. The reactor is maintained at a superatmospheric pressure of 25 to 1000 and preferably 150 to 1000 atmospheres, and a temperature of 25° to 250° C., and preferably 50° to 250° C., the combination of conditions and concentration of the charge being arranged to provide polymerization of the vinyl fluoride. A slurry of particulate vinyl fluoride polymer in water is removed from the reactor at a rate sufficient to maintain conditions within the reactor conducive to polymerization. After isolating the resulting vinyl fluoride polymer from the slurry by filtration, centrifuging or the like, the polyvinyl fluoride in the form of a powder or cake can be washed with water or an organic solvent and dried. A process falling within the above description is described in U.S. application Serial No. 856,573, filed December 1, 1959, and assigned to the assignee of the present application.

The vinyl fluoride monomer can be prepared by the hydrofluorination of acetylene according to the process described in U.S. Patent 2,118,901. The monomer can also be prepared by the dehydrofluorination of 1,1-difluoroethane using any of the processes described in U.S. Patents 2,480,560; 2,599,631; and 2,674,632.

The water-soluble reaction initiators useful in the above process include those free radical generating catalysts in the following list: water-soluble salts of inorganic per acids, e.g., ammonium persulfate, potassium persulfate, potassium perphosphate, potassium percarbonate; organic peroxides which contain hydrophyllic groupings of sufficient effect to render them water-soluble, e.g., beta,beta'-bis-carboxypropionyl peroxide, t-butyl hydrogen peroxide; alkali metal salts of carboxylic azonitriles of the types described in U.S. Patent 2,520,338, e.g., alpha,alpha' - azobis(alpha - methyl - gamma - carboxybutyronitrile), alpha,alpha' - azobis(alpha,gamma,gamma - trimethyl - gamma - carboxybutyronitrile), alpha,alpha' - azobis(alpha - methyl - gamma - phenyl - gamma-carboxybutyronitrile), alpha,alpha' - azobis(alpha - propyl - gamma - carboxybutyronitrile), alpha,alpha' - azobis(alpha,gamma - dimethyl - gamma - carboxyvaleronitrile); and inorganic acid salts of azoamidines of the types described in U.S. Patent 2,599,299, e.g., the dihydrochlorides of 2,2'-diguanyl-2,2'-azopropane,2,2'-diguanyl - 2,2' - azobutane,2,2' - bis(N - phenylguanyl) - 2,2'-azopropane, 2,2'-bis(N,N-diethyl guanyl)-2,2'-azopropane and 2,2' - bis(N - hydroxyethylguanyl)-2,2'-azopropane. The preferred reaction initiator is 2,2'-diguanyl-2,2'-azopropane dihydrochloride.

The improvement in the process for the polymerization of vinyl fluoride which is the basis of the present invention comprises introducing into the reactor to the extent of from about 10 to about 10,000 parts by weight of a mono-olefin of at least 3 carbon atoms per million parts by weight of vinyl fluoride.

Any mono-olefin having at least 3 carbon atoms can be employed in the improved process of this invention. Those mono-olefins having at least 3 but not more than 7 carbon atoms are preferred. The most preferred mono-olefins are those having 3 but not more than 5 carbon atoms, and particularly a mono-olefin selected from the group consisting of propylene and the butylenes, i.e., 1-butene, 2-butene and isobutylene.

The mono-olefin can be continuously introduced into the polymerization reactor either as a component of the vinyl fluoride feed stream or as a separate feed stream. While the mono-olefin can be employed to the extent of from about 10 to about 10,000 parts by weight per million parts by weight of the vinyl fluoride fed into the reactor, in the case of the lower mono-olefins such as propylene and the butylenes, a level of from about 250 to about 2500 parts by weight per million parts by weight of vinyl fluoride has been found extremely effective in delaying the appearance of low molecular weight polymer in the effluent slurry.

The resulting vinyl fluoride polymeric products will be useful in the form of films, foils, sheets, ribbons, bands, rods, tubing and molded objects. They will also be useful as coatings for fabrics, leather, cellulosic materials such as paper, etc. It will also be possible to combine these vinyl fluoride polymers with plasticizers, modifiers, stabilizers, softeners, dyes, pigments, fillers, etc.

The invention will be more fully understood by referring to the following examples.

*Example 1*

A stream of filtered, deionized, substantially deoxygenated water containing 111 parts by weight of 2,2'-diguanyl-2,2'-azopropane dihydrochloride, as reaction initiator initiator, per million parts by weight of water was continuously fed at a rate of 480.5 pounds/hour into a stainless steel reactor operated at 97° C. and 4000 p.s.i. The pressure in the reactor was maintained at 4000 p.s.i.

by automatically controlling the rate at which the product was withdrawn. Simultaneously, vinyl fluoride at a rate of 47.3 pounds/hour was fed into the reactor. Propylene at a concentration of 1000 parts by weight per million parts by weight of vinyl fluoride had been added to the vinyl fluoride stream.

The contents of the reactor were agitated continuously to provide intimate mixture of the feed streams throughout the interior of the reactor. The product slurry composed of finely particulate vinyl fluoride polymer and water was removed at a rate to provide 22.8 pounds of polymer/hour/cu. ft. of reactor volume. The polymer was separated from the slurry by filtration and recovered as a substantially dry powder.

There are many quality control tests performed at frequent intervals on vinyl fluoride polymers produced by the above continuous polymerization process, but one in particular, the melt-flow number (MFN) has been found to provide a sensitive index by which to judge polymer quality. The melt-flow number gives a rough indication of polymeric molecular weight, varying inversely therewith.

The melt-flow number of a polymer is the square of the average diameter in inches of a roughly circular film disc resulting from the pressing between two polished chromium-plated steel plates of a one-inch diameter wafer consisting of $1.00 \pm 0.01$ gram of the polymer in dried, particulate, compressed form for 5 minutes at $260 \pm 1°$ C. under a total load of 12,250 lbs. It is determined according to the following procedure:

A quantity of particulate vinyl fluoride polymer (1.00 $\pm 0.01$ gram) dried to less than 0.2% water by weight, is transferred to the one-inch diameter die of a Buehler metallurgical mounting press, the plug inserted and the die pressed for a few moments at a load of about 5,000 pounds. After releasing the load, removing and disassembling the die, the resulting polymer wafer is one-inch in diameter and about 100 mils thick. The polymer wafer is centered between two polished chromium-plated steel plates, 0.02 inch thick and cut $5'' \times 8''$ with corners and edges smooth. This assembly is then centered between the platens of a Carver laboratory press, the temperature of the surface of the center of each platen being maintained at $260 \pm 1°$ C. The Carver press has 5-inch by 5-inch electrically heated platens and is rated for a load of up to 10 tons. The polymer wafer is then pressed for 5 minutes at this temperature under a load of 12,250 pounds as indicated by the load gauge pointer. As the polymer mass melts and increases in diameter, it is necessary to pump up the press periodically to hold the load constant. At the end of the 5 minute pressing period, the load is immediately released and the plate-polymer-plate assembly is removed from the press and immersed quickly in cool water. After allowing the assembly to remain for several minutes under water, the plates are separated and the film removed, dried by blotting and its diameter measured to the nearest 0.01 inch. If the film disc is irregular, eight diameters are measured and averaged arithmetically. The square of the diameter is the melt-flow number of the polymer. The melt-flow number for the vinyl fluoride polymer of Example I ranged from 7.34 to 7.88 throughout the entire production run. The continuous polymerization was conducted for 38.8 hours before shutting down without signs of objectionably high melt-flow number.

*Example II*

The process of Example I was repeated except that the vinyl fluoride feed rate was 48.5 pounds/hour and the water feed rate was 481.6 pounds/hour. The propylene concentration remained the same while the reaction initiator concentration was 114 parts per million parts of water. The polymer production rate was 24.4 pounds of polymer/hour/cu. ft. of reactor volume. The melt-flow number throughout the entire run of 32.8 hours ranged from 7.24 to 8.08. The run was shut down without signs of objectionably high melt-flow number.

*Example III*

The process of Example I was repeated except that the vinyl fluoride feed rate was 49.1 pounds/hour and the water feed rate was 478.3 pounds/hour. The polymer production rate was 17.8 pounds of polymer/hour/cu. ft. of reactor volume. The reaction initiator concentration was 101 parts per million parts of water while the propylene concentration was gradually increased from 250 parts per million parts of vinyl fluoride at the start of the run until it reached 4,000 p.p.m. parts of vinyl fluoride shortly before the run was terminated after 81 hours of continuous operation. The melt-flow number throughout the run ranged from 7.30 to 7.89. There was no sign of objectionably high melt-flow number at the termination of the run.

In control A, the process of Example I was repeated but without the addition of a monoolefin. The vinyl fluoride feed rate was 46.8 pounds/hour and the water feed rate was 479.2 pounds/hour. The polymer production rate was 22.2 pounds of polymer/hour/cu. ft. of reactor volume. The reaction initiator concentration in the feed water was 87.4 p.p.m. Polymerization was continued for 10.9 hours before the run had to be terminated because of the sudden appearance of polymer of excessively high melt-flow number, i.e., 8.07 to 11.53. The melt-flow number range of normal polymer, i.e., polymer produced during the "on control" portion of this run was 7.41 to 7.87.

In control B, the process of Example I was repeated but without the addition of a mono-olefin. The vinyl fluoride feed rate was 49.7 pounds/hour and the water feed rate was 475.5 pounds/hour. The polymer production rate was 24.6 pounds of polymer/hour/cu. ft. of reactor volume. The reaction initiator concentration was 91 parts per million parts of water. Polymerization was continued for 24 hours before the run had to be terminated because of the sudden appearance of polymer of excessively high melt-flow number, i.e., 8.13 to 8.74. The melt-flow number range of normal polymer, i.e., polymer produced during the "on control" portion of this run was 7.11 to 7.84.

In control C, the process of Example I was repeated but without the addition of a mono-olefin. The vinyl fluoride feed rate was 48.4 pounds/hour and the water feed rate was 477.5 pounds/hour while the polymer production rate was 24.5 pounds of polymer/hour/cu. ft. of reactor volume. The reaction initiator concentration was 80.8 parts per million parts of water. Polymerization was continued for 20.3 hours before the run had to be terminated because of the sudden appearance of polymer of excessively high melt-flow number, i.e., 8.51. The melt-flow number range of normal polymer, i.e., polymer produced during the "on control" portion of this run was 7.28 to 7.70.

In control D, the process of Example I was repeated but without the addition of a mono-olefin. The vinyl fluoride feed rate was 48.3 pounds/hour and the water feed rate was 482.7 pounds/hour while the polymer production rate was 25.6 pounds of polymer/hour/cu. ft. of reactor volume. The reaction initiator concentration was 101 parts per million parts of water. Polymerization was continued for 25 hours before the run had to be terminated because of the sudden appearance of polymer of excessively high melt-flow number, i.e., 7.97 to 8.73. The melt-flow number range of normal polymer, i.e., polymer produced during the "on control" portion of this run was 6.78 to 7.85.

*Example IV*

Example I was repeated except that the vinyl fluoride feed rate was 65.0 pounds/hour and the water feed rate was 627.2 pounds/hour. The pressure in the reactor was maintained at 8000 p.s.i. The polymer production rate was 13.7 pounds of polymer/hour/cu. ft. of reactor volume. The reaction initiator concentration was 97 parts per million parts of water and the proplyene concentration in the vinyl fluoride stream was 300 parts per million parts of vinyl fluoride. Polymerization was continued for 17.0 hours before shutting the run down. The melt-flow number ranged from 6.7 to 7.0 and there was no indication of objectionably high melt-flow number.

*Example V*

Example I was repeated except that the vinyl fluoride feed rate was 65.0 pounds/hour and the water feed rate was 618.8 pounds/hour. The pressure in the reactor was maintained at 8,000 p.s.i. The polymer production rate was 19.5 pounds of polymer/hour/cu. ft. of reactor volume. The reactor initiator concentration was 104 parts per million parts of water and the propylene concentration in the vinyl fluoride stream was 500 parts per million parts of vinyl fluoride. Polymerization was continued for 99.3 hours, without any indication of objectionably high melt-flow number, before the run was shut down. The melt-flow number ranged from 6.6 to 7.0.

*Example VI*

Example I was repeated except that the vinyl fluoride feed rate was 65.0 pounds/hour and the water feed rate was 630.0 pounds/hour. The pressure in the reactor was maintained at 8,000 p.s.i. The polymer production rate was 18.7 pounds of polymer/hour/cu. ft. of reactor volume. The reaction initiator concentration was 90 parts per million parts of water and isobutylene was used as the mono-olefin at a concentration in the vinyl fluoride stream of 700 parts per million parts of vinyl fluoride. Polymerization was continued for 80 hours, without any indication of objectionably high melt-flow number, before the run was shut down. The melt-flow number ranged from 6.6 to 7.0.

In control E, the process of Example IV was repeated but without the addition of a monolefin. The vinyl fluoride feed rate was 69.0 pounds/hour and the water feed rate was 680.6 pounds/hour. The polymer production rate was 14 pounds of polymer/hour/cu. ft. of reactor volume. The reaction initiator concentration was 65 parts per million parts of water. Polymerization was continued for 11.3 hours before the run had to be terminated because of the sudden appearance of polymer of excessively high melt-flow number, i.e., 8.0 to 10.5. The melt-flow number range of normal polymer, i.e., polymer produced during the "on control" portion of this run was 6.7 to 7.0.

What is claimed is:

1. In a process for the homopolymerization of vinyl fluoride wherein vinyl fluoride, water and a water-soluble free radical reaction initiator are introduced into a reactor maintained at a constant temperature and a superatmospheric pressure, the contents of the reactor are maintained in a highly dispersed state, a slurry consisting substantially of vinyl fluoride polymer and water is removed from the reactor and the vinyl fluoride polymer recovered from the slurry, the improvement comprising introducing into the reactor a mono-olefin of from 3 to 7 carbon atoms to the extent of from about 10 to less than 10,000 parts per million parts by weight of vinyl fluoride.

2. The process as in claim 1 wherein from about 250 to about 2,500 parts by weight of a mono-olefin selected from the group consisting of propylene and the butylenes is introduced into the reactor per million parts by weight of vinyl fluoride.

References Cited by the Examiner

UNITED STATES PATENTS

| | | | |
|---|---|---|---|
| 2,423,749 | 7/1947 | Austin | 260—92.1 |
| 2,479,957 | 8/1949 | Newkirk | 260—92.1 |
| 3,029,231 | 4/1962 | Van Amerongen | 260—87.5 |

JOSEPH L. SCHOFER, *Primary Examiner.*

HAROLD N. BURSTEIN, *Examiner.*

W. G. GOODSON, *Assistant Examiner.*